(12) United States Patent
Huang et al.

(10) Patent No.: US 10,775,105 B2
(45) Date of Patent: *Sep. 15, 2020

(54) METHODS FOR THE DESOLVENTIZATION OF BAGASSE

(71) Applicant: Bridgestone Corporation, Chuo-ku (JP)

(72) Inventors: Yingyi Huang, Hudson, OH (US); Mark W. Smale, Hudson, OH (US); William M. Cole, Norton, OH (US)

(73) Assignee: Bridgestone Corporation, Chuo-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/194,630

(22) Filed: Nov. 19, 2018

(65) Prior Publication Data

US 2020/0158433 A1    May 21, 2020

(51) Int. Cl.
*F26B 23/00* (2006.01)
*B01D 11/02* (2006.01)

(52) U.S. Cl.
CPC .......... *F26B 23/00* (2013.01); *B01D 11/0296* (2013.01)

(58) Field of Classification Search
CPC .......... F26B 23/00; F26B 21/00; F26B 21/06; F26B 21/08; F26B 3/04; B01D 11/0296; B07B 11/05
USPC .......................................................... 34/443
See application file for complete search history.

(56) References Cited

U.S. PATENT DOCUMENTS

| | | |
|---|---|---|
| 702,678 A | 6/1902 | Prampolini |
| 741,258 A | 10/1903 | Lawrence |
| 814,407 A | 3/1906 | Von Stechow |
| 843,567 A | 2/1907 | Bradshaw |
| 957,495 A | 3/1909 | Chute et al. |
| 979,902 A | 9/1910 | Van der Linde |
| 999,493 A | 8/1911 | Ellis |
| 999,708 A | 8/1911 | Ellis |
| 1,003,139 A | 9/1911 | Kelley |
| 1,007,681 A | 11/1911 | Ellis |
| 1,051,987 A | 2/1913 | Chute |
| 1,103,903 A | 7/1914 | Kendall |
| 1,105,568 A | 7/1914 | Kendall |
| 1,135,236 A | 4/1915 | Wheeler et al. |
| 1,161,135 A | 11/1915 | Kaminski et al. |
| 1,167,264 A | 1/1916 | Brooks |
| 1,189,549 A | 7/1916 | Ellis |
| 1,189,550 A | 7/1916 | Ellis |
| 1,242,886 A | 10/1917 | Meyer |
| 1,247,814 A | 11/1917 | Garza |
| 1,550,319 A | 8/1925 | Hopkinson |
| 1,671,570 A | 5/1928 | Carnahan |
| 1,695,676 A | 12/1928 | Yeandle |
| 1,735,835 A | 11/1929 | Kohno |
| 1,740,079 A | 12/1929 | Edison |
| 1,753,184 A | 4/1930 | Spence |
| 1,753,185 A | 4/1930 | Spence |
| 1,829,502 A | 10/1931 | Calcott et al. |
| 1,989,502 A | 10/1931 | Calcott et al. |
| 1,833,287 A | 11/1931 | Hadley |
| 1,903,500 A | 4/1933 | Calcott |
| 2,138,895 A | 12/1938 | Wiezevich |
| 2,187,146 A | 1/1940 | Calcott et al. |
| 2,281,336 A | 4/1942 | Stacom |
| 2,339,418 A | 1/1944 | McKay |
| 2,364,394 A | 12/1944 | Sibley |
| 2,373,689 A | 4/1945 | Kenda |
| 2,387,521 A | 10/1945 | Martin |
| 2,390,860 A | 12/1945 | Williams |
| 2,399,156 A | 4/1946 | Stamberger et al. |
| 2,408,853 A | 10/1946 | Hoover et al. |
| 2,410,780 A | 11/1946 | Gracia |
| 2,410,781 A | 11/1946 | Gracia |
| 2,425,011 A | 8/1947 | Smith |
| 2,434,412 A | 1/1948 | Jones |
| 2,459,369 A | 1/1949 | Tint et al. |
| 2,475,141 A | 7/1949 | Jones |
| 2,522,136 A | 9/1950 | Schaffer |
| 2,549,763 A | 4/1951 | Banigan, Jr. et al. |
| 2,572,046 A | 10/1951 | Meeks et al. |
| 2,618,670 A | 11/1952 | Clark |
| 2,665,317 A | 1/1954 | Clark et al. |
| 2,744,125 A | 5/1956 | Meeks et al. |
| 2,864,561 A | 12/1958 | Mork |
| 3,141,281 A | 7/1964 | Guant et al. |
| 3,311,601 A | 3/1967 | Conley |
| 3,376,158 A | 4/1968 | Buser |
| 4,107,902 A | 8/1978 | Suggs |
| 4,122,012 A | 10/1978 | Blasnik |

(Continued)

FOREIGN PATENT DOCUMENTS

AU 2012202924 A 5/1942
CA 2866427 A1 * 9/2013 ............... C08C 3/02

(Continued)

OTHER PUBLICATIONS

International Products Brochure 2007.
Abstract—Week 200365 Thomson Scientific, London, GB; AN 2003-682828; XP000002567182, JP 2003 040902 A (Nitta Denko Corp) (dated Feb. 13, 2003).
Adler, R.J. et al., Freeze Coagulation of ABS Latex, Ind. Eng. Chem. Res. vol. 36 pp. 2156-2162 (dated 1997).
ASTM International, Standard Test Methods for Rubber from Natural Sources—Chemical Analysis, D 1278, 2002, pp. 246-251.
Bedane, G. M., et al., Development and Evaluation of a Guayule Debarker, Industrial Crops and Products, vol. 34, pp. 1256-1261 (2011).
Beintema, Nienke, Rubber From Dandelions and Shrubs, Wageningen World, No. 1, pp. 16-17, 2012.

(Continued)

*Primary Examiner* — Stephen M Gravini
(74) *Attorney, Agent, or Firm* — Meredith E. Hooker; Jenny L. Sheaffer

(57) ABSTRACT

Provided herein are methods for the removal of organic solvents from wet bagasse. The use of the methods result in dried bagasse that contains no more than 1 weight percent organic solvents.

26 Claims, No Drawings

(56) References Cited

U.S. PATENT DOCUMENTS

| | | |
|---|---|---|
| 4,136,131 A | 1/1979 | Buchanan |
| 4,159,903 A | 7/1979 | Bauman |
| 4,198,324 A | 4/1980 | Lal et al. |
| 4,243,561 A | 1/1981 | Lal et al. |
| 4,246,001 A | 1/1981 | Bauman |
| 4,269,242 A | 5/1981 | Smith et al. |
| 4,272,436 A | 6/1981 | Lal et al. |
| 4,363,188 A | 12/1982 | Dastoor et al. |
| 4,376,189 A | 3/1983 | Trivette |
| 4,376,835 A | 3/1983 | Schmitt et al. |
| 4,376,853 A | 3/1983 | Gutierrez et al. |
| 4,405,532 A | 9/1983 | Gutierrez et al. |
| 4,410,656 A | 10/1983 | Coran et al. |
| 4,412,031 A | 10/1983 | Kitahara et al. |
| 4,412,041 A | 10/1983 | Kitahara et al. |
| 4,424,171 A | 1/1984 | Gutierrez et al. |
| 4,433,114 A | 2/1984 | Coran et al. |
| 4,434,266 A | 2/1984 | Trivette, Jr. |
| 4,435,337 A | 3/1984 | Kay et al. |
| 4,493,925 A | 1/1985 | Trivette, Jr. |
| 4,496,683 A | 1/1985 | Morita |
| 4,499,243 A | 2/1985 | Rader |
| 4,513,110 A | 4/1985 | Rader |
| 4,525,541 A | 6/1985 | Kitahara et al. |
| 4,526,929 A | 7/1985 | Kishida et al. |
| 4,526,959 A | 7/1985 | Kay et al. |
| 4,530,995 A | 7/1985 | Gutierrez et al. |
| 4,542,191 A | 9/1985 | Kay et al. |
| 4,557,306 A | 12/1985 | Graves |
| 4,559,378 A | 12/1985 | Kay et al. |
| 4,568,711 A | 2/1986 | Kay et al. |
| 4,570,690 A | 2/1986 | Graves |
| 4,585,826 A | 4/1986 | Graves |
| 4,591,631 A | 5/1986 | Beattie et al. |
| 4,591,632 A | 5/1986 | Moore |
| 4,609,336 A | 9/1986 | Stevenson et al. |
| 4,616,068 A | 10/1986 | Schloman, Jr. et al. |
| 4,616,075 A | 10/1986 | Malani et al. |
| 4,621,118 A | 11/1986 | Schloman, Jr. et al. |
| 4,622,365 A | 11/1986 | Scholman, Jr. et al. |
| 4,623,713 A | 11/1986 | Beinor et al. |
| 4,638,028 A | 1/1987 | Lui et al. |
| 4,647,607 A | 3/1987 | Kay et al. |
| 4,677,153 A | 6/1987 | Kitahara et al. |
| 4,678,860 A | 7/1987 | Kuester |
| 4,681,929 A | 7/1987 | Cole et al. |
| 4,684,715 A | 8/1987 | Kay et al. |
| 4,687,810 A | 8/1987 | Coran |
| 4,728,343 A | 3/1988 | Snyder |
| 4,739,037 A | 4/1988 | Kay et al. |
| 4,739,038 A | 4/1988 | Schloman, Jr. |
| 4,751,271 A | 6/1988 | Graves |
| 4,761,446 A | 8/1988 | Graves et al. |
| 4,762,870 A | 8/1988 | Graves et al. |
| 4,778,857 A | 10/1988 | Graves et al. |
| 4,786,683 A | 11/1988 | Schloman, Jr. et al. |
| 4,792,583 A | 12/1988 | Coran |
| 4,804,741 A | 2/1989 | Verbiscar et al. |
| 4,822,845 A | 4/1989 | Graves et al. |
| 4,829,117 A | 5/1989 | Schloman, Jr. et al. |
| 4,927,887 A | 5/1990 | Tate |
| 4,975,497 A | 12/1990 | Tate et al. |
| 4,983,729 A | 1/1991 | Sikora |
| 4,988,388 A | 1/1991 | Schloman |
| 5,234,564 A | 8/1993 | Smith |
| 5,247,009 A | 9/1993 | Kitahara |
| 5,272,203 A | 12/1993 | Joyner |
| 5,306,862 A | 4/1994 | Cappell et al. |
| 5,321,111 A | 6/1994 | Ji |
| 5,362,807 A | 11/1994 | Nogura et al. |
| 5,379,948 A | 1/1995 | Teppo |
| 5,411,147 A | 5/1995 | Bond |
| 5,453,051 A | 9/1995 | Schlough |
| 5,468,539 A | 11/1995 | Crivelli |
| 5,473,024 A | 12/1995 | Thames et al. |
| 5,580,942 A | 12/1996 | Cornish |
| 5,599,868 A | 2/1997 | Bohm et al. |
| 5,616,075 A | 4/1997 | Winstanley et al. |
| 5,633,433 A | 5/1997 | Backhaus et al. |
| 5,645,234 A | 7/1997 | Del Zotto |
| 5,651,953 A | 7/1997 | Yokoyama et al. |
| 5,717,050 A | 2/1998 | Cornish |
| 5,872,186 A | 2/1999 | Ang |
| 5,998,512 A | 12/1999 | Schloman |
| 6,014,998 A | 1/2000 | Mowdood |
| 6,054,525 A | 4/2000 | Schloman et al. |
| 6,132,711 A | 10/2000 | Backhaus et al. |
| 6,231,970 B1 | 5/2001 | Andersen et al. |
| 6,382,425 B1 | 5/2002 | Brickner et al. |
| 6,399,673 B1 | 6/2002 | Thames et al. |
| 6,482,884 B1 | 11/2002 | Schaal |
| 6,492,447 B2 | 12/2002 | Chestnut et al. |
| 6,645,747 B1 | 11/2003 | Hallahan et al. |
| 6,726,025 B1 | 4/2004 | Huskey |
| 6,734,245 B2 | 5/2004 | Baranek |
| 6,787,590 B2 | 9/2004 | Nakayama et al. |
| 6,816,876 B2 | 11/2004 | Koffler et al. |
| 6,818,676 B2 | 11/2004 | Koffler et al. |
| 7,026,678 B2 | 4/2006 | Coursey |
| 7,205,456 B2 | 4/2007 | Hallahan et al. |
| 7,228,881 B1 | 6/2007 | Smith |
| 7,259,231 B2 | 8/2007 | Cornish et al. |
| 7,540,438 B2 | 6/2009 | Buranov |
| 7,629,397 B2 | 12/2009 | McDonald et al. |
| 7,790,036 B2 | 9/2010 | Cornish et al. |
| 7,851,210 B2 | 12/2010 | Darling et al. |
| 7,923,039 B2 | 4/2011 | Cornish et al. |
| 7,955,611 B2 | 6/2011 | Brown et al. |
| 8,013,213 B2 | 9/2011 | Mau et al. |
| 8,080,358 B2 | 12/2011 | Murakami |
| 8,241,873 B2 | 8/2012 | Diner et al. |
| 8,268,121 B2 | 9/2012 | Blount |
| 8,815,965 B2 | 8/2014 | Cole et al. |
| 9,138,660 B2 | 9/2015 | Yahamoto |
| 9,315,589 B2 | 4/2016 | Huang et al. |
| 9,328,211 B2 | 5/2016 | Nemato et al. |
| 9,546,224 B2 | 1/2017 | Cole et al. |
| 9,562,720 B2 * | 2/2017 | Huang ..................... C08C 4/00 |
| 9,567,457 B2 | 2/2017 | Huang et al. |
| 9,611,334 B2 | 4/2017 | Huang et al. |
| 9,637,562 B2 | 5/2017 | Huang et al. |
| 9,890,262 B2 | 2/2018 | Huang et al. |
| 10,023,660 B2 | 7/2018 | Randall et al. |
| 10,113,011 B2 | 10/2018 | Cole et al. |
| 10,132,563 B2 * | 11/2018 | Huang ..................... C08C 4/00 |
| 10,138,304 B2 | 11/2018 | Huang et al. |
| 10,287,367 B2 | 5/2019 | Huang et al. |
| 10,316,110 B2 | 6/2019 | Huang et al. |
| 10,471,473 B2 | 11/2019 | Huang et al. |
| 2002/0006987 A1 | 1/2002 | Nakayama |
| 2003/0138403 A1 | 7/2003 | Drustrup |
| 2004/0265343 A1 | 12/2004 | Hill |
| 2005/0011812 A1 | 1/2005 | Nelson |
| 2005/0050759 A1 | 3/2005 | Chandran et al. |
| 2006/0070167 A1 | 4/2006 | Eng et al. |
| 2006/0106183 A1 | 5/2006 | Cornish et al. |
| 2006/0149015 A1 | 7/2006 | Cornish |
| 2006/0217512 A1 | 9/2006 | Mau et al. |
| 2006/0218660 A1 | 9/2006 | Dong et al. |
| 2006/0225144 A1 | 10/2006 | Hallahan et al. |
| 2007/0265408 A1 | 11/2007 | Cornish et al. |
| 2007/0276112 A1 | 11/2007 | Buranov |
| 2008/0015336 A1 | 1/2008 | Cornish et al. |
| 2008/0172998 A1 | 7/2008 | Fraley et al. |
| 2008/0221246 A1 | 9/2008 | Imam et al. |
| 2008/0300526 A1 | 12/2008 | Gumbs |
| 2008/0317933 A1 | 12/2008 | Williamson |
| 2009/0054595 A1 | 2/2009 | Cornish et al. |
| 2009/0099309 A1 | 4/2009 | Gumbs |
| 2009/0099327 A1 | 4/2009 | Cornish et al. |
| 2009/0163689 A1 | 5/2009 | Cornish et al. |
| 2009/0191243 A9 | 7/2009 | Hill et al. |
| 2009/0199425 A1 | 8/2009 | Taylor |
| 2009/0256375 A1 | 10/2009 | Haskins |

(56) References Cited

U.S. PATENT DOCUMENTS

| | | |
|---|---|---|
| 2010/0210745 A1 | 8/2010 | McDaniel et al. |
| 2011/0021743 A1 | 1/2011 | Cornish et al. |
| 2011/0054051 A1 | 11/2011 | Cole et al. |
| 2011/0275142 A1 | 11/2011 | Wade et al. |
| 2013/0029009 A1 | 1/2013 | Darling et al. |
| 2013/0067808 A1 | 3/2013 | Stachen et al. |
| 2014/0336288 A1 | 11/2014 | Cole et al. |
| 2015/0073113 A1 | 3/2015 | Huang et al. |
| 2015/0126673 A1 | 5/2015 | Randall et al. |
| 2015/0136882 A1 | 5/2015 | Huang et al. |
| 2015/0184933 A1 | 7/2015 | Huang et al. |
| 2015/0190848 A1 | 7/2015 | Huang et al. |
| 2017/0081429 A1 | 5/2017 | Cole et al. |
| 2017/0146291 A1 | 5/2017 | Huang et al. |
| 2017/0152326 A1 | 6/2017 | Huang et al. |
| 2017/0226309 A1 | 8/2017 | Huang et al. |
| 2018/0371112 A1* | 12/2018 | Querci ................. C08C 1/02 |
| 2019/0284309 A1* | 9/2019 | Huang ................. C08C 1/04 |

FOREIGN PATENT DOCUMENTS

| | | | |
|---|---|---|---|
| CA | 2876958 A1 * | 12/2013 | ............ C08C 4/00 |
| CN | 1442193 A | 4/2003 | |
| CN | 1860850 A | 11/2006 | |
| CN | 101671404 A | 3/2010 | |
| CN | 101906176 A | 12/2010 | |
| EA | 2011170418 A1 | 12/2011 | |
| EP | 87109 A1 | 8/1983 | |
| EP | 100434 A2 | 2/1984 | |
| EP | 105822 A2 | 4/1984 | |
| EP | 164137 A2 | 12/1985 | |
| EP | 179211 A1 | 4/1986 | |
| EP | 179211 B1 | 4/1986 | |
| EP | 180716 A1 | 5/1986 | |
| EP | 87109 B2 | 10/1986 | |
| EP | 0039910 B1 | 4/1987 | |
| EP | 105822 B1 | 6/1988 | |
| EP | 180716 B1 | 4/1989 | |
| EP | 100434 B1 | 9/1989 | |
| EP | 476641 B1 | 3/1992 | |
| EP | 491229 B1 | 6/1992 | |
| EP | 0509768 A2 | 10/1992 | |
| EP | 938350 B1 | 11/2006 | |
| EP | 1752277 A2 | 2/2007 | |
| EP | 675202 A1 | 10/2009 | |
| EP | 2183303 A1 | 5/2010 | |
| EP | 1969036 B1 | 3/2011 | |
| EP | 2822974 B1 * | 2/2017 | ............ C08C 2/06 |
| EP | 3546508 A1 * | 10/2019 | ............ F26B 21/145 |
| GB | 545410 A | 5/1942 | |
| GB | 2164341 A | 3/1986 | |
| GB | 2174403 A | 11/1986 | |
| JP | S61-264005 A | 11/1986 | |
| JP | 62000502 A | 1/1987 | |
| JP | H06-100704 A | 4/1994 | |
| JP | H08-283309 A | 10/1996 | |
| JP | H11-012306 A | 1/1999 | |
| JP | 2003-040902 A | 2/2003 | |
| JP | 2003-313366 A | 11/2003 | |
| JP | 2006348067 | 12/2006 | |
| JP | 2006348607 A | 12/2006 | |
| JP | 2007-126676 A | 5/2007 | |
| JP | 2007224067 A | 9/2007 | |
| RU | 2027746 C1 | 1/1995 | |
| SU | 15590 A1 | 6/1930 | |
| SU | 47819 A1 | 7/1936 | |
| SU | 47820 A1 | 7/1936 | |
| SU | 50447 A1 | 11/1936 | |
| SU | 66332 A1 | 11/1945 | |
| SU | 72175 A1 | 11/1947 | |
| WO | 1981003255 A1 | 11/1981 | |
| WO | 9803255 A1 | 1/1998 | |
| WO | 2001010946 A2 | 2/2001 | |
| WO | 2001049257 A1 | 7/2001 | |
| WO | 2009054595 A1 | 4/2009 | |
| WO | 2009095059 A1 | 8/2009 | |
| WO | 2009129249 A2 | 10/2009 | |
| WO | 2013134429 A1 | 9/2013 | |
| WO | 2013134430 A1 | 9/2013 | |
| WO | WO-2013134429 A1 * | 9/2013 | ............ C08C 3/02 |
| WO | 2013173625 A1 | 11/2013 | |
| WO | 2013192182 A1 | 12/2013 | |
| WO | 2013192217 A1 | 12/2013 | |
| WO | 2013192227 A1 | 12/2013 | |
| WO | WO-2013192227 A1 * | 12/2013 | ............ C09K 3/00 |
| WO | 2015038707 A1 | 3/2015 | |

OTHER PUBLICATIONS

Belmares. H. et al. New Rubber Peptizers and Coatings Derived from Guayule Resin, Industrial and Engineering Chemistry: Product Research and Development, vol. 19, pp. 107-111 (1980).

Benedict, H.M. The Effect of Waste Products From the Guayule Rubber Mill on the Growth of Various Crops. Journal of the American Society of Agronomy, vol. 40: pp. 1005-1016 (1948).

Bhowmick, et al. Effect of Resin Components on the Degradation of Guayule Rubber, Journal of Applied Polymer Science, vol. 30, pp. 2367-2388 (dated 1985).

Biosolids Dewatering, Promotional Mateiral, FKC Co. Ltd., accessed Jul. 30, 2015 at http://fkescrewpress.com/docs/fkcbiosolids2.pdf.

Bonner, J., and A.W. Galson. Toxic Substances From the Culture Media of Guayule Which May Inhibit Growth. Botanical Gazette, vol. 106; pp. 185-198 (1944).

Buranov, Anvar U., et al., Extraction and Characterization of Latex and Natural Rubber from Rubber-Bearing Plants, J. Agric. Food Chem. 2010, 58, 734-743.

Buranov, Anvar, et al., "Rubber-Bearing Plants of Central Asia," Conf. Title Industrial Crops and Rural Development, Conf. date Sep. 17, 2005.

Cataldo, F. Guayule Rubber: A New Possible World Scenario for the Production of Natural Rubber Progress in Rubber and Plastics Technology, vol. 16, No. 1 (dated 2000).

Centrifugation and Centrifuges, Lenntech, accessed Dec. 6, 2011 at http://www.lenntech.com/library/clarification/centrifugation.htm.

Chang, M., and G.T. Tsao. Hydrolysis of Guayule Cellulose for Alcohol Production. E.C. Gregg, J.L. Tipton and H.T. Huang, ends., Proceedings of the Third International Guayule Conference, Pasadena, Clif., Guayule Rubber Soc.: Riverside, Calif., pp. 211-224 (1983).

Crown Model IV and Model V Extractors, Flyer, Crown Iron Works Company, accessed Jul. 30, 2015 at http://www.crowniron.com/userfiles/image/specialty%20extractor%20insert1.pdf (dated Nov. 2006).

Curtis, Jr., "Distribution of Rubber and Resins in Guayule", Plance Physiology, vol. 22, No. 4. pp. 333-359 (dated Oct. 1947).

Decanters from GEA Westfalia Separator, Mechanical Separation, GE Westfalia Separator, www.westfalia-separator.com (2010).

Doering, "Guayule Rubber in Tires and Tubes, Service Tests in Which the Rubber was Exclusively Guayule", Industrial and EngineeringChemistry, vol. 26, No. 5, pp. 541-543, (dated May 1934).

Extraction Decanters from GEA Westfalia Separator, GEA Westfalia Separator Group, accessed May 30, 2012 at http://www.westfalia-separator.com/products/decanters/extraction-decanters.html.

Gelling, I.R. Modification of Natural Rubber Latex With Peracetic Acid. Rubber Chemistry and Technology. vol. 58, pp. 86-96. (1985).

Himayah H. Naqvi and George P. Hanson; American Journal of Botany, vol. 69, No. 6 (Jul. 1982) pp. 985-989; Germination and Growth Inhibitors in Guayule (*Parthenium argentatum* Gray) Chaff and Their Possible Influence in Seed Dormancy.

Jordi Labs, printout from http://lifescience.ca/DAT/CATALOGUE/211~v~Polymer_Solubility_Index.pdf, printed Aug. 5, 2014.

Keller, B.A., editor, Rubber and Rubber-Plants (book), pp. 408-410, published 1936.

Keller, R.W., D.S. Winkler, and H.L. Stephens. Degradative Effects of Guayule Resin on Natural Rubber. Rubber Chemistry and Technology. vol. 54, pp. 115-123, (1981).

(56) References Cited

OTHER PUBLICATIONS

King, R.J., and D.M. Mondimore. HPLC Procedure for the determination of Free Sulfur in Natural Rubber Formulations, Rubber Chemistry and Technology. vol. 60, pp. 716-720 (1987).
Kuester, J.L., C.M. Fernandez, T.C. Wang, and G. Heath. Liquid Hydrocarbon Fuel Potential of Agricultural Materials. In R.P. Overend. T.A. Milne, and L.K. Mudge, eds., International Conference on Fundamentals of Thermochemical Biomass Conversion, 1982, Estes Park Colo., Elsevier Applied Science: London, pp. 875-895 (1985).
Kuester, J.L., Liquid Hydrocarbon Fuels From Biomass (1981).
Makitra, et al., "Dependence of Natural Rubber Swelling Index Upon Organic Solvents Properties", Chemistry & Chemical Technology, vol. 5, No. 1, pp. 19-24 (dated 2011).
McIntyre, et al., "Guayule Rubber," Handbook of Elastomers, pp. 1-27 (dated 2001).
Meeker, T.R.; Specialty Isoprene Based Polymers—Derivatives From the General Purpose Polymers; Doc. 1848; Spring 1985.
Murphy, J. Brad and C.A. Stutte; Analyitical Biochemistry 86, 220-228 (1978); Analysis for Substituted Benzoic and Cinnamic Acids Using High-Pressure Liquid Chromatography.
Presentation pages by Schloman, W.W., Jr. undated (submitted via third party observations in PCT/US2013/041422 on Aug. 6, 2014).
Reynolds, Cynthia, "The Russians Are Coming," www2.macleans.ca/2011/08/11/the-russians-are-coming, Aug. 11, 2011.
Rubber Developments vol. 39 No. 1, pp. 23-24; Your Questions Answered (1986).
Rysselberge, Jacques Van, Utilisation De Bitumes Elastomeres (1976).
Schloman, W. W. Jr., et al., Seasonal Effects on Guayule Resin Composition, J. Agricultrual and Food Chemistry, vol. 34, pp. 177-179 (1986).
Schloman, W.W. Jr. et al., Rubber Additives Derived from Guayule Resin, Industrial and Eng'r Chem. Research, vol. 27, pp. 712-716 (1988).
Schloman, W.W. Jr., et al., Guayule Byproduct Evaluation: Extract Characterization, J. Agricultural and Food Chemistry, vol. 31 pp. 873-876 (1983).
Schloman, W.W. Jr., et al., Water Stress and Seasonal Effects on Rubber Quality in Irrigated Guayule, J. Agricultural and Food Chemistry vol. 34, pp. 683-685 (1986).
Schloman, W.W., Jr., "Processing Guayule for Latex and Bulk Rubber," Industrial Crops and Products, vol. 22 No. 1, pp. 41-47, 2005.
Screw Press Operating Hints (CC series), Vincent Corporation, accessed May 31, 2012 at http://www.vincentcorp.com/screw_press_operating_hints_%28cp%20series%29 (dated Mar. 26, 2009).
Screw press, Wikipedia, accessed May 28, 2012 at http://wikipedia.org/wiki/screw_press.
Sin Siew Weng, Some Traditional and New Uses of Skim Rubber, Rubber Research Institute of Malaysia, Proceedings of RRIM Planters Conference (1981).
Stillage Dewatering Screw Press, Promotional Material, FKC Co. Ltd, accessed Jul. 30, 2015 at http://www.fkescrewpress.com/docs/spentgrain_stillageflyerweb.pdf.
Subramaniam. A., J. Rubb. Res. Inst. Malaysia 25(2), 61-68; estimation of Aldehyde Groups in Natural Rubber with 2, 4-dinitrophenylhydrazine (1977).
Tanaka, Y. Structural Characterization of Natural Polyisoprenes: Solve the Mystery of Natural Rubber Based on Structural Study Rubber Chemistry and Technology vol. 74, 355, (dated 2001).
Touzinsky, G.F.; Northern Regional Research Center: Agricultural Research, Science and Education Administration; Guayule as a Source of papermaking Fiber, 5th International Dissolving Pulps Conference, Vienna, pp. 311-315 (1980).
Van Beillen, Jan B, et al., "Guayule and Russian dandelion as alternative sources of natural rubber," CRC Critical Reviews in Biotechnology, CRC Press, vol. 27, No. 1, Jan. 2007, pp. 217-231.
Vincent Corporation, Screw Press Operating Hints, Sep. 17, 2009.
Australian Patent Exam Report for 2009236328 dated Jul. 2, 2013.
Second Australian Patent Exam Report 2009236328 dated Jan. 30, 2014.
Response to Australian Office Action, (dated Dec. 23, 2013).
First Office Action in Chinese Application No. 2009801224454 (dated Mar. 27, 2012).
Second Office Action in Chinese Application No. 2009801224454 (dated Jun. 27, 2012).
EP 09733501 Communication Pursuant to Article 94(3) EPC, (dated May 10, 2012).
Extended Search Report, EP 09733501 (dated Aug. 19, 2011).
Response to the Extended European Search Report dated Mar. 8, 2012.
Response to European Office Action dated Sep. 20, 2012.
Communication pursuant to Article 94(3) EPC dated Jan. 15, 2013.
Invitation pursuant to Article 94 (3) and Rule 71(1) EPC dated Feb. 8, 2013.
Response to EPO dated Apr. 9, 2013.
Notification of Intent to Grant from European Patent Office dated Jun. 12, 2013.
Japanese Office Action for 2011-505140 dated Jan. 7, 2014.
Non-final Office Action issued in U.S. Appl. No. 12/937,284 dated Dec. 11, 2012.
Response filed in U.S. Appl. No. 12/937,284 dated Jun. 13, 2013.
Final Office Action issued in U.S. Appl. No. 12/937,284 dated May 31, 2013.
Response filed in U.S. Appl. No. 12/937,284 dated Oct. 30, 2013.
Non-final Office Action issued in U.S. Appl. No. 12/937,284 dated Nov. 13, 2013.
Response filed in U.S. Appl. No. 12/937,284 dated Mar. 31, 2014.
Notice of allowance issued in U.S. Appl. No. 12/937,284 dated Apr. 16, 2014.
Non-final Office Action issued in U.S. Appl. No. 14/338,581 dated Feb. 3, 2016.
Response filed in U.S. Appl. No. 14/338,581 dated Apr. 19, 2016.
Notice of Allowance issued in U.S. Appl. No. 14/338,581 dated May 2, 2016.
RCE filed on Aug. 2, 2016 in U.S. Appl. No. 14/338,581.
International Preliminary Report on Patentability and Written Opinion (corresponding PCT Application No. PCT/US2009/040543); (8 pages) (dated Oct. 19, 2010).
International Search Report (corresponding PCT Application No. PCT/US2009/040543); Authorized Officer Kang, Hyunk Seok; (2 pages) ( dated Nov. 9, 2009).
Examination report issued in application No. AU2013230936 (dated Feb. 26, 2016).
Response filed on May 16, 2016 in application No. AU2013230936).
Response filed on Apr. 22, 2016 in AU application 2013230935.
Examination report issued in application No. AU2013230935 (dated Feb. 25, 2016).
Office Action issued in application No. CN2013-80021313.9 (dated Jun. 2, 2015).
Office Action issued in application No. CN2013-80021313.9 (dated Nov. 3, 2015).
Office Action issued in application No. CN201380021313.9 (dated Jan. 18, 2016).
Third Office Action dated May 2016 in CN application 201380023740.0.
Office Action issued in application No. CN201380023740.0 (dated May 26, 2015).
Office Action issued in application No. CN2013-80023740.0 (dated Dec. 16, 2015).
Supplemental European Search Report in EP national stage (EP13758291.2) from PCT/US2013/02951, dated Oct. 26, 2015.
Response submitted in application No. EP13758291.2 (filed Apr. 14, 2016).
Supplemental European Search Report in EP national stage (EP13757665.8) from PCT/US2013/029449), dated Oct. 26, 2015.
Response submitted in application No. EP13757665.8 (filed Apr. 14, 2016).
Office action dated May 4, 2015 in U.S. Appl. No. 14/383,379.
Response filed Jul. 31, 2015 in U.S. Appl. No. 14/383,379.
Notice of Allowance dated Aug. 19, 2015 in U.S. Appl. No. 14/383,379.

(56) References Cited

OTHER PUBLICATIONS

Notice of allowanced dated Feb. 29, 2016 in U.S. Appl. No. 14/383,379.
Response dated Jul. 7, 2016 in U.S. Appl. No. 14/383,380.
Final Office Action dated Jul. 21, 2016 in U.S. Appl. No. 14/383,380.
Office action dated Apr. 12, 2016 in U.S. Appl. No. 14/383,380.
International Preliminary Report on Patentability and Written Opinion (PCT Application No. PCT/US2013/029451), dated Sep. 2, 2014.
Search Report from PCT/US2014/029451, dated Jun. 21, 2013.
International Preliminary Report on Patentability and Written Opinion (PCT Application No. PCT/US2013/029449), dated Sep. 22, 2014.
Search Report from PCT/US2014/029449, dated Jun. 21, 2013.
Examination report dated Mar. 2016 in AU application 2013262725.
Response filed in AU application 2013262725 (dated Aug. 10, 2016).
Second examination report dated Aug. 23, 2016 in AU application 2013262725.
Response filed in AU application 2013262725 (dated Sep. 12, 2016).
First Office Action in Chinese application 201380031854.X (dated Sep. 11, 2015).
Second Office Action issued in CN application 201380031854.X. (dated May 13, 2016).
Supplemental Search Report and opinion dated May 2016 in application EP 13792144.0.
International Preliminary Report on Patentability and Written Opinion from PCT/US2013/041422, dated Nov. 18, 2014.
Search Report from PCT/US2013/041422, dated Nov. 21, 2013.
Third party obsevations submitted in PCT/US2013/041422 dated Nov. 21, 2014.
Examination report dated May 2016 in AU application 2013277296.
Response filed Jul. 1, 2016 in AU application 2013277296.
Supplemental Search Report and opinion dated Feb. 2016 in EP application 13807874.2.
Response dated Jul. 12, 2016 in EP application 13807874.2.
Examination report dated May 2, 2016 in AU application 2013277335.
Response dated Jul. 1, 2016 in AU application 2013277335.
Office Action issued in application No. CN2013-80032039.5 (dated Sep. 1, 2015).
Second Office Action dated May 2016 in CN application 201380032039.5.
Supplemental Search Report and opinion dated Feb. 2016 in EP application 13806430.8.
Response filed Jun. 23, 2016 in EP application 13806430.8.
Search Report from PCT/US13/46328, dated Oct. 11, 2013.
International Preliminary Report on Patentability and Written Opinion from PCT/US13/46328, dated Dec. 23, 2014.
Examination Report dated Feb. 2016 in AU application 2013277286.
Response filed May 2016 in AU application 2013277286.
Office Action issued in application No. CN2013-80032056.9 (dated Sep. 6, 2015).
Second Office Action dated May 2016 in CN application 201380032056.9.
Response filed May 19, 2016 in EP application 13807611.2.
Search Report from PCT/US13/46380, dated Oct. 9, 2013.
International Preliminary Report on Patentability and Written Opinion from PCT/US13/46380, dated Dec. 23, 2013.
Office Action from U.S. Appl. No. 14/483,455, dated Apr. 27, 2016.
Response filed in U.S. Appl. No. 14/483,455 dated Aug. 26, 2016.
International Search Report with Written Opinion from PCT Application No. PCT/US2014/055086, dated Feb. 5, 2015.
Agricultural Encyclopedia of China (Volume of Crops), volume one, compiled by Editorial Dept. form Agricultural of China, pp. 719-720, China Agricultural Press, Apr. 1991.
Notice of Allowance issued in U.S. Appl. No. 14/338,581 dated Aug. 30, 2016.
Non-final office action issued in U.S. Appl. No. 15/364,527 dated Feb. 13, 2018.
Examination report issued in application No. AU2016222428 (dated Jan. 2017).
Response filed in Aug. 2017 in AU application 2016222428.
Examination report issued in application AU2016213719 (dated Jan. 2017).
Response filed in application AU2016213719 dated Mar. 2017.
Fourth Office Action issued in application No. CN2013-80023740.0 (dated Oct. 2016).
Decision of Rejection issued in application No. CN2013-80023740.0 (dated May 2017).
European Search Report in EP application (16205645), dated May 11, 2017.
Response submitted in appliation No. EP16205645 dated Dec. 7, 2017.
Grant notice issued in application No. EP16205645 dated Mar. 23, 2018.
European Search Report and Opinion in EP application 17168837, dated Jun. 30, 2017 and May 29, 2017.
Response submitted in application No. EP17168837.7 dated Mar. 13, 2018.
Office action issued in RU application No. 2014140181 dated Feb. 14, 2017.
Office action issued in RU application No. 2014140183 dated Feb. 10, 2017.
Response dated Sep. 1, 2016 in U.S. Appl. No. 14/383,380.
Notice of alllowance dated Dec. 27, 2017 in U.S. Appl. No. 14/383,380.
Office action dated Jul. 29, 2016 in U.S. Appl. No. 15/130,050.
Response filed Oct. 13, 2016 in U.S. Appl. No. 15/130,050.
Notice of allowance dated Nov. 21, 2016 in U.S. Appl. No. 15/130,050.
Non-final office action rejection from U.S. Appl. No. 15/477,152 dated Jun. 28, 2017.
Response filed Sep. 28, 2017 in U.S. Appl. No. 15/477,152.
Notice of allowance dated Oct. 6, 2017 in U.S. Appl. No. 15/477,152.
Allowance dated Sep. 23, 2016 in AU application 2013262725.
Examination reported issued in AU application 2017200069 dated Aug. 2017.
Response submitted in AU application 2017200069 dated Mar. 2018.
Grant notice issued in AU application 2017200069 dated Apr. 2018.
Third Office Action issued in CN application 201380031854.X (dated Dec. 6, 2016).
Response filed in application EP13792144.0 dated Aug. 30, 2016.
Office action issued in RU application 2014150798 dated Apr. 5, 2017.
Non-final office action from U.S. Appl. No. 14/401,749, dated Aug. 24, 2017.
Response filed in U.S. Appl. No. 14/401,749 dated Nov. 2017.
Notice of allowance issued in U.S. Appl. No. 14/401,749 dated Mar. 2018.
Allowance dated Aug. 2016 in AU application 2013277296.
Second office action from application CN201380032071.3, dated Aug. 29, 2017.
First office action from application CN201380032071.3, dated Feb. 7, 2017.
Office action issued in RU application 2015101234 dated Mar. 29, 2017.
Notice of allowance dated Oct. 2016 in U.S. Appl. No. 14/409,132.
Notice of allowance dated Feb. 27, 2018 in U.S. Appl. No. 15/424,224.
Allowance dated Aug. 2016 in AU application 2013277335.
Third Office Action dated Nov. 2016 in CN application 201380032039.5.
Non-final rejection issued in U.S. Appl. No. 14/409,117 dated Jan. 25, 2018.
Response filed in U.S. Appl. No. 14/409,117 dated Apr. 25, 2018.
Allowance dated Jun. 2016 in AU application 2013277286.
Examination report dated Jun. 2017 in AU application 2016235014.
Third Office Action issued in application No. CN2013-80032056.9 (dated Nov. 2016).
Grant notice dated Sep. 2016 in EP application 13807611.2.
Search report from EP application 17152493.7 dated May 2017.

(56) References Cited

OTHER PUBLICATIONS

Response filed in EP application No. 17152493.7 dated Oct. 16, 2017.
Grant notice dated Jan. 2018 in EP application No. 17152493.7.
Office action issued in application RU2015101287, dated Apr. 2017.
Office action issued in application RU2015101287, dated Jul. 2017.
Non-final office action issued in U.S. Appl. No. 14/409,124 dated Jan. 25, 2018.
Response filed in U.S. Appl. No. 14/409,124 dated Apr. 25, 2018.
Final Office Action from U.S. Appl. No. 14/483,455, dated Sep. 16, 2016.
Response filed in U.S. Appl. No. 14/483,455 dated Sep. 22, 2016.
Notice of Allowance issued in U.S. Appl. No. 14/483,455 dated Sep. 29, 2016.
Third party submission including statements of relevance submitted in U.S. Appl. No. 15/430,938 dated Aug. 24, 2017.
Response filed in U.S. Appl. No. 15/364,527 dated May 14, 2018.
Examination report from application AU 2018-226498, dated Jun. 2019.
Exam Report from Australian patent application 2014210597 dated Sep. 1, 2015.
Response filed in U.S. Appl. No. 15/498,983 dated Jan. 9, 2019.
Notice of allowance from U.S. Appl. No. 15/498,983 dated Feb. 1, 2019.
Response filed in Australian patent application 2014210597 dated Feb. 15, 2016.
Response filed in Australian patent application 2009236328 dated Apr. 29, 2014.
Notice of allowance from Australian patent application 2009236328 dated Jun. 4, 2014.
Notice of allowance issued in U.S. Appl. No. 15/364,527 dated Jun. 27, 2018.
Extended European Search Report and Opinion from European patent application No. 18192589.2 dated Jan. 17, 2019.
Response filed in European patent application No. 18192589.2 dated Apr. 10, 2019.
Notice of allowance for Canadian patent application 2866432 dated Apr. 4, 2019.
Office action issued in U.S. Appl. No. 15/430,938 dated Jul. 20, 2018.
Response filed in U.S. Appl. No. 15/430,938 dated Dec. 20, 2018.
Response filed in European patent application 18205670.5 dated Nov. 8, 2019.
Office action in Canadian patent application 2866427 dated Apr. 8, 2019.
Response filed in Canadian patent application 2866427 dated Oct. 8, 2019.
Response filed in Australian patent application 2016213719 dated Mar. 29, 2019.
Notice of allowance in Canadian patent application 2873783 dated Jun. 6, 2019.
Office action issued in Chinese patent application 2017-10590888.2 dated May 5, 2018.
Notice of allowance issued in U.S. Appl. No. 15/430,938 dated Jan. 22, 2019.
Notice of allowance issued in U.S. Appl. No. 15/430,938 dated Feb. 21, 2019.
Third party submissions filed in U.S. Appl. No. 15/430,938 dated Aug. 24, 2017.
Intent to grant issued in European patent application 17168837.7 dated May 29, 2018.
Intent to grant issued in European patent application 13758291 dated Aug. 4, 2016.
Office action issued in Canadian patent application 2876958 dated Jun. 18, 2019.
Fourth office action issued in Chinese patent application 201380032071.3 dated Sep. 26, 2018.
Decision of Rejection issued in Chinese patent application 201380032071.3 dated Mar. 1, 2019.
Notice of intent to grant issued in European patent application 13807847.2 dated Nov. 28, 2018.
Extended European Search Report and Search Opinion issued in European patent application 19173187.6.
Notice of allowance issued in U.S. Appl. No. 15/424,224 dated Jul. 18, 2018.
Office action issued in European patent application 13806430 dated Dec. 20, 2018.
Response filed in European patent application 13806430 dated Apr. 29, 2019.
Office action issued in U.S. Appl. No. 14/409,117 dated Jun. 28, 2018.
Response and RCE filed in U.S. Appl. No. 14/409,117 dated Sep. 25, 2018.
Office action issued in U.S. Appl. No. 14/409,117 dated Dec. 11, 2018.
Response filed in U.S. Appl. No. 14/409,117 dated Feb. 25, 2019.
Notice of allowance issued in U.S. Appl. No. 14/409,117 dated Jul. 10, 2019.
Response filed in Australian patent application 2016-235014 dated Apr. 22, 2018.
Notice of allowance issued in U.S. Appl. No. 14/409,124 dated Aug. 9, 2018.
International Search Report for WO 2013/192227 (PCT/US2013/046409) Heo, Joo Hyung, dated Oct. 16, 2013.
International Preliminary Report on Patentability for WO 2013/192227 (PCT/US2013/046409) Bai, Linffei, dated Dec. 23, 2014.
Supplemental Search Report and opinion dated Feb. 2016 in EP application 13807611.2.
Communication pursuant to Article 94(3) EPC, dated Jan. 15, 2013 (EP09733501).
Office action issued in application No. CN201380021313.9 (dated Dec. 2016).
International Preliminary Examination Report with PCT Search Report and Written Opinion from PCT Application No. PCT/US2014/055086, 9 pages, dated Mar. 2016.
ICPI Workshop 2011, "Weed Washer," What is a Micron (Micron v/s Mesh), available at http:/www.fs.usda.gov/Internet/FSE_DOCUMENTS/stelprdb5366477.docx, accessed Aug. 2016.
Intent to grant notification from application EP 18192589.2, dated Nov. 25, 2019.
Notice of allowance from U.S. Appl. No. 15/894,301, dated Dec. 16, 2019.
Notice of allowance from U.S. Appl. No. 15/894,301, dated Feb. 27, 2020.
Intent to grant notification from application EP 18205670.5, dated Jan. 2020.
Response filed in application EP 19173187.6, dated Apr. 2020.

\* cited by examiner

METHODS FOR THE DESOLVENTIZATION OF BAGASSE

CROSS REFERENCE TO RELATED APPLICATIONS

This application is a continuation of U.S. application Ser. No. 15/424,224, filed Feb. 3, 2017, which is a continuation of U.S. application Ser. No. 14/409,132, filed Dec. 18, 2014 and issued on Feb. 7, 2017 as U.S. Pat. No. 9,562,720, which is a U.S. national stage of International Application No. PCT/US2013/046409, filed Jun. 18, 2013, which claims priority to U.S. Provisional Application Ser. No. 61/660,971, filed Jun. 18, 2012, all of which are hereby incorporated by reference in their entirety.

BACKGROUND

The *Hevea* plant or tree (also called *Hevea brasiliensis* or a rubber tree) is a well-known source of natural rubber (also called polyisoprene). Rubber sources such as *Hevea brasiliensis*, *Ficus elastic* (India rubber tree) and *Cryptostegia grandiflora* (Madagascar rubbervine) produce natural rubber in the form of a sap where the rubber is suspended in an aqueous solution that flows freely and can be recovered by tapping of the plant. Various non-*Hevea* plants are also known to contain natural rubber, but their rubber is stored within the individual cells of the plant (e.g., stems, roots or leaves) and cannot be accessed by tapping but can only be accessed by breaking down the cell walls by physical or other means. Thus, processes for the removal of rubber from non-*Hevea* plants are generally more complicated and entailed than processes for harvesting rubber from *Hevea* trees. The use of organic solvent-based rubber extraction processes with non-*Hevea* plants generally results in separate streams of rubber and bagasse. The bagasse contains a quantity of any organic solvents that are utilized in the rubber extraction process.

SUMMARY

Part of the by-product of an organic solvent-based process for the removal of rubber from non-*Hevea* plants is a quantity of wet bagasse or wet insoluble plant matter. The wet bagasse contains the material from the plant that has not solubilized in the organic solvents (i.e., mostly cellulose-type material along with some quantity of dirt) and residual organic solvents from the rubber removal process. Disclosed herein are processes for removing organic solvents from wet bagasse.

In a first embodiment, a method for removing organic solvents from wet bagasse is provided. The method comprises utilizing a quantity of wet bagasse that contains up to 75 weight % combined organic solvents and water (based upon the total weight of the wet bagasse) and no more than 0.1 weight % rubber; heating the wet bagasse to a temperature of at least 100° C. whereby the organic solvents are evaporated; and producing dried bagasse that contains no more than 1 weight % organic solvents.

DETAILED DESCRIPTION

Disclosed herein are processes for removing organic solvents from wet bagasse.

Definitions

The terminology as set forth herein is for description of the embodiments only and should not be construed as limiting the invention as a whole.

As used herein, the term non-*Hevea* plant is intended to encompass plants that contain natural rubber within the individual cells of the plant.

As used herein the term "bagasse" is used to refer to that portion of the ground or chopped plant matter from a non-*Hevea* plant that is insoluble and hence is suspended rather than dissolved by organic solvents. As used herein, bagasse should be understood to include dirt and ash, unless otherwise specified.

As used herein the term "plant matter" means material obtained from a non-*Hevea* plant. Unless otherwise specified, the plant matter may include roots, stems, bark, woody material, pith, leaves and dirt.

As used herein the term "resin" means the naturally occurring non-rubber chemical entities present in non-*Hevea* plant matter, including but not limited to resins (such as terpenes), fatty acids, proteins, and inorganic materials.

As used herein the term "dirt" (such as used in the connection with the solid purified rubber produced by the processes disclosed herein) means non-plant material that may be associated with non-*Hevea* plants, particularly upon harvesting, such as soil, sand, clay and small stones. Dirt content in solid purified rubber can be determined by completely re-dissolving the solid rubber and pouring the solution through a 45 micron sieve. The sieve is then rinsed with additional solvent and dried. The weight of the material retained on the sieve represents the "dirt" content of the solid purified rubber.

Processes

In a first embodiment, a method for removing organic solvents from wet bagasse is provided. The method comprises utilizing a quantity of wet bagasse that contains up to 75 weight % combined organic solvents and water (based upon the total weight of the wet bagasse) and no more than 0.1 weight % rubber; heating the wet bagasse to a temperature of at least 100° C. whereby the organic solvents are evaporated; and producing dried bagasse that contains no more than 1 weight % organic solvents.

In a first sub-embodiment of the first embodiment, a method is provided for removing organic solvents from wet guayule bagasse. The method comprises utilizing a quantity of wet guayule bagasse that contains up to 75 weight % combined organic solvents and water (based upon the total weight of the wet bagasse) and no more than 0.1 weight % rubber. The wet guayule bagasse is heated to a temperature of greater than 100° C. by placing the wet guayule bagasse in an apparatus containing multiple layers, circulating heated air through the layers of the apparatus and passing the wet guayule bagasse from one layer to another whereby the organic solvents are evaporated. After evaporation of the organic solvents, dried guayule bagasse that contains no more than 1 weight % organic solvents is produced.

In a second sub-embodiment of the first embodiment, a method is provided for removing organic solvents from wet guayule bagasse. The method comprises utilizing a quantity of wet guayule bagasse that contains up to 75 weight % combined of acetone and hexane (based upon the total weight of the wet guayule bagasse) and no more than 0.1 weight % rubber. The wet guayule bagasse is heated to a temperature of greater than 100° C. whereby the organic solvents are evaporated. After evaporation of the organic solvents, dried guayule bagasse that contains no more than 1 weight % organic solvents is produced.

The source of the bagasse may be one or more of various non-*Hevea* rubber-containing plants. More specifically, the bagasse usually results from a rubber extraction process (e.g., organic solvent extraction) that is performed upon a non-*Hevea* rubber-containing plant matter. It is contemplated that various organic solvent-based processes may be utilized for extraction of the rubber from the non-*Hevea* rubber-containing plant matter that produces the wet bagasse. Exemplary organic solvent-based processes are disclosed in U.S. Patent Application Ser. Nos. 61/607,448, 61/607,460 and 61/607,469, the entire disclosure of each being herein incorporated by reference.

In certain embodiments of the first embodiment (e.g., the first and second sub-embodiments described herein), the bagasse is from guayule shrubs. More specifically, such bagasse usually results from a rubber extraction process that is performed upon guayule shrub plant matter.

As previously discussed, in the first embodiments and in the first and second sub-embodiments described herein, the wet bagasse or the wet guayule bagasse, respectively, contains up to 75 weight % combined organic solvents and water (based upon the total weight of the wet bagasse). The organic solvents comprise any organic solvents used to remove rubber and resins from the non-*Hevea* plant matter. The wet bagasse also may contain varying amounts of water and varying but generally very small amounts of unextracted rubber and unextracted resin. In certain embodiments according to the first embodiment and in certain embodiments of the first and second sub-embodiments of the processes disclosed herein, the wet bagasse contains up to 7-10 weight % water and up to 0.1 weight % unextracted rubber along with a certain amount of unextracted resin. Preferably, according to the first embodiment and according to the first and second sub-embodiments of the processes disclosed herein, the wet bagasse contains no more than 8-10 weight % organic solvents. Preferably, according to the first embodiment and according to the first and second sub-embodiments of the processes disclosed herein, the wet bagasse contains no more than 0.05 weight % combined unextracted rubber.

As previously discussed, in the first embodiment and according to the first and second sub-embodiments, the wet bagasse or wet guayule bagasse is heated to a temperature of greater than 100° C. whereby the organic solvents are evaporated. Depending upon the type of apparatus utilized to heat the wet bagasse or wet guayule bagasse, it is possible that temperatures somewhat lower than 100° C. can be utilized, such as temperatures from 70-100° C., as exemplified in the working Examples. In certain embodiments according to the first embodiment and certain embodiments according to the first and second sub-embodiments, the wet bagasse or wet guayule bagasse is heated to a temperature between 110 and 200° C. In certain other embodiments according to the first embodiment and certain embodiments according to the first and second sub-embodiments, the wet bagasse or wet guayule bagasse is heated to a temperature between 100 and 150° C. In yet other embodiments according to the first embodiment and certain embodiments according to the first and second sub-embodiments, the wet bagasse or wet guayule bagasse is heated to a temperature between 125 and 150° C.

As those skilled in the art will appreciate the particular time during which the heating of the wet bagasse or wet guayule bagasse is continued can be impacted by factors such as the quantity of wet bagasse, the combined organic solvent and water content of the wet bagasse, the temperature to which it is heated. In certain embodiments according to the first embodiment and in certain embodiments according to the first and second sub-embodiments of the processes disclosed herein, the heating of the wet bagasse (or wet guayule bagasse) occurs for 30 second to 1.5 hours, including from 5 minutes to 90 minutes at a temperature of 100-150° C. In certain embodiments according to the first embodiment and in certain embodiments according to the first and second sub-embodiments of the processes disclosed herein, the heating occurs for no more than 10 minutes at a temperature of at least 110° C. In other embodiments according to the first embodiment and according to the first and second sub-embodiments of the processes disclosed herein, the heating occurs for no more than 8 minutes at a temperature of at least 125° C.

As previously discussed, in the first embodiment and in the first and second sub-embodiments of the processes disclosed herein, the dried bagasse contains no more than 1 weight % organic solvent (based upon the total weight of the dried bagasse). In addition to the organic solvent content of the dried bagasse, the dried bagasse may contain a quantity of water and higher boiling point terpenes. Generally, the total quantity of water and higher boiling point terpenes in the dried bagasse may be higher than the content of organic solvents. Resin content (including the higher boiling point terpenes) in the dried bagasse is generally acceptable and in some instances actually preferred as the resin can be helpful in those embodiments where the dried bagasse is briquetted or otherwise compressed. In certain embodiments of the first embodiment of the processes disclosed herein, the dried bagasse contains no more than 0.5 weight % organic solvent (based upon the total weight of the dried bagasse).

As previously discussed, in the first embodiment and in the first and second sub-embodiments of the processes disclosed herein, the wet bagasse or wet guayule bagasse is heated to a temperature of at least 100° C. whereby the organic solvents are evaporated. Various methods may be utilized for the heating of the wet bagasse. In certain embodiments according to the first embodiment, and according to the first and second embodiments disclosed herein, the heating of the wet bagasse (or wet guayule bagasse) to the temperatures previously provided takes place in an apparatus selected from one of the following: i. a dryer containing multiple layers, circulating heated air through the layers of the apparatus and passing the wet guayule bagasse from one layer to another whereby the organic solvents are evaporated; ii. a dryer containing multiple paddles for mixing the wet bagasse with heated air to evaporate the organic solvent; or iii. a desolventization screw extruder. In certain such embodiments, the heating is achieved by placing the wet bagasse (or wet guayule bagasse) in an apparatus containing multiple layers, circulating heated air through the layers of the apparatus and passing the wet bagasse from one layer to another. Suitable equipment for achieving such heating of the wet bagasse (or wet guayule bagasse) includes continuous tray-type dryers, including those with rotating trays and distributed trays such as those available from Wyssmont Company (Fort Lee, N.J.). In other embodiments, the heating is achieved by placing the wet bagasse (or wet guayule bagasse) in a dryer containing multiple paddles for mixing the wet bagasse with heated air to evaporate the organic solvent. Suitable equipment for achieving such heating of the wet bagasse (or wet guayule bagasse) includes continuous type air swept tubular dryers, including those with paddles or baffles for mixing the wet bagasse with heated air, such as those available from Scott Equipment Co., New Prague, Minn. Further details as to exemplary air swept tubular dryers are provided in U.S. Pat. No. 5,570,517, the entire disclosure of which is incorporated herein by reference. In yet other embodiments, the heating is achieved by placing the wet bagasse (or wet guayule bagasse) in a desolventization screw extruder. In other embodiments, the heating is achieved by heated steam. Heating can also be achieved using a desolventizer, a dryer and/or a cooler.

In certain embodiments according to the first embodiment and according to the first and second sub-embodiments of the processes disclosed herein, the method of removing organic solvents from the wet bagasse further comprises condensing the evaporated organic solvents and collecting them separately from the dried bagasse.

According to the first sub-embodiment, a method is provided for removing organic solvents from wet guayule bagasse. The method comprises providing a quantity of wet guayule bagasse that contains up to 75 weight % combined organic solvents and water (based upon the total weight of the wet guayule bagasse) and no more than 0.1 weight % rubber. (The organic solvents including any polar organic solvents and non-polar organic solvents that may have been utilized in the rubber extraction process.) The wet guayule bagasse is heated to a temperature between 100 and 200° C. by placing the wet guayule bagasse in an apparatus containing multiple layers, circulating heated air through the layers of the apparatus and passing the wet guayule bagasse from one layer to another whereby the organic solvents are evaporated. After evaporation of the organic solvents, dried bagasse that contains no more than 1 weight % organic solvents is produced.

In certain embodiments according to the first sub-embodiment of the processes disclosed herein, the heating occurs for no more than 10 minutes at a temperature of at least 110° C. In other embodiments according to the first sub-embodiment of the processes disclosed herein, the heating occurs for no more than 8 minutes at a temperature of at least 125° C.

According to the second sub-embodiment, a method is provided for removing organic solvents from wet guayule bagasse. The method comprises providing a quantity of wet guayule bagasse that contains a quantity of (in weight %) of acetone, hexane and water combined (based upon the total weight of the wet guayule bagasse) and no more than 0.1 weight % rubber. The wet guayule bagasse is heated to a temperature of greater than 100° C. whereby the acetone and hexane are evaporated. After evaporation of the organic solvents, dried bagasse that contains no more than 1 weight % combined weight of acetone and hexane is produced.

As previously discussed, according to the second sub-embodiment, the wet guayule bagasse is heated to a temperature greater than 100° C. whereby the organic solvents are evaporated. In certain embodiments according to the second embodiment, the wet guayule bagasse is heated to a temperature between 110 and 200° C.

In certain embodiments according to the second sub-embodiment of the processes disclosed herein, the heating occurs for no more than 10 minutes at a temperature of 100 to 200° C. In other embodiments according to the second embodiment of the processes disclosed herein, the heating occurs for no more than 8 minutes at a temperature of 105 to 130° C.

As previously discussed, according to the first embodiment and the first and second sub-embodiments of the processes disclosed herein, the dried bagasse contains no more than 1 weight % organic solvent (based upon the total weight of the dried bagasse). In addition to the organic solvent content of the dried bagasse, the dried bagasse may contain a quantity of water and higher boiling point terpenes. Generally, the total quantity of water and higher boiling point terpenes in the dried bagasse may be higher than the content of organic solvents. The total quantity of water and higher boiling point terpenes may vary, although the amount of water is preferably minimized to no more than 10 weight % (based on the total weight of the dried bagasse), even more preferably no more than 5 weight %. In certain such embodiments of the processes disclosed herein, the dried bagasse contains no more than 0.5 weight % organic solvent (based upon the total weight of the dried bagasse). In yet other such embodiments of the processes disclosed herein, the dried bagasse contains no more than 0.2 weight % organic solvent (based upon the total weight of the dried bagasse).

As previously discussed, according to the second sub-embodiment of the processes disclosed herein, the wet guayule bagasse is heated to a temperature of greater than 100° C. whereby the acetone and hexane are evaporated. Various methods may be utilized for the heating of the wet guayule bagasse. In one embodiment of the second sub-embodiment of the processes disclosed herein, the heating is achieved by placing the wet guayule bagasse in an apparatus containing multiple layers, circulating heated air through the layers of the apparatus and passing the wet guayule bagasse from one layer to another. Suitable equipment for achieving this type of heating includes continuous tray-type dryers such as those available from Wyssmont Company (Fort Lee, N.J.). In other embodiments of the second embodiment of the processes disclosed herein, the heating is achieved by the use of other apparatus, including those discussed above.

In certain embodiments according to the second sub-embodiment of the processes disclosed herein, the method of removing acetone and hexane from the wet guayule bagasse further comprises condensing the evaporated organic solvents and collecting them separately from the dried bagasse.

In certain embodiments according to the first embodiment and according to the first and second sub-embodiments of the processes disclosed herein, the dried bagasse is compressed by a compression machine to form a compressed material. In certain embodiments, the compressed material is a briquette or pellet that has a density that is 150-325% higher than the density of the non-compressed chopped plant matter. In yet other embodiments, the briquettes have a density that is 40-100% higher than the density of the non-compressed chopped plant matter. Briquettes with such densities can provide advantages in terms of being easier to produce and easier to grind and dissolve in organic solvent. In certain embodiments, the briquettes have a density of 3 to 8.5 pounds/gallon (0.4 to 1 kg/liter). This density is the true density of the briquettes (excluding the volume of pores) and not a bulk density. Various methods (e.g., optical, gas expansion and liquid imbibitions) for determining the true density of a porous solid exist and are known to those skilled in the art, but they all generally entail measuring the volume of pores existing within the porous solid so that this volume can be excluded from the volume that is used to calculate true density.

As used herein the terms briquette and pellet are used interchangeably and should be construed broadly to encompass various forms or shapes, including, but not limited to, pellets, cubes, rectangular solids, spherical solids, egg-shaped solids, bricks and cakes. Various methods exist for compacting the bagasse into briquettes. One method of preparing briquettes from the bagasse is to utilize a commercial briquetting machine to prepare the briquettes. Various companies manufacture these machines and they are available in various sizes and specifications. Exemplary briquetting machines include those manufactured by K. R. Komarek, Inc. (Wood Dale, Ill.), including the roll-type briquetting machines model no. B 100R and BR200QC.

Generally, a briquetting machine utilizes a roll-type system to compact material, with or without the addition of a binder to the material that is being compressed. Pressure can be applied by the machine in varying amounts depending upon the machine utilized, the properties of the chipped plant matter and the properties desired in the briquettes. In certain embodiments, briquettes of bagasse from guayule shrubs are made using a briquetting machine. In certain of the foregoing embodiments, binder is applied to the bagasse plant matter prior to its being compressed into briquettes. In certain of these embodiments, the binder comprises resin (e.g., guayule resin) that has been extracted from the plant matter during the rubber extraction process. Other methods of preparing briquettes of bagasse from non-*Hevea* plants may be utilized within the scope of the processes and systems disclosed herein. In this regard, the disclosure of U.S. Patent Application Ser. No. 61/607,475 entitled "Processes For Recovering Rubber From Non-*Hevea* Plants Using Briquettes" is herein incorporated by reference.

EXAMPLES

Example 1

Simulated wet bagasse was prepared by mixing 73.84 grams of hexane, 18.44 grams of acetone and 228.48 grams of bagasse together. The bagasse had been obtained after organic solvent extraction and solvent rinsing of wet guayule pellets. Prior to organic solvent the wet guayule pellets were found to contain 11.74 weight % moisture, 6.67 weight % rubber (dry weight basis) and 8.44 weight % resin (dry weight basis). Prior to use in the wet bagasse, the bagasse was analyzed and found to contain 8.19 weight % moisture, 1.55 weight % rubber and 2.56 weight % resin. The simulated wet bagasse was placed in a preheated 64 ounce stainless steel bowl on a hot plate set at 125° C. The wet bagasse was agitated with a mechanical mixer. Samples were taken at various drying times. Percent volatiles were measured by thermogravimetric analysis. Weight % hexane+ acetone was analyzed by head space gas chromatography. The drying time to a residual solvent level (i.e., hexane+ acetone) of no more than 0.5 weight % in the bagasse was found to be about 6 minutes. Results are reported in Table 1.

TABLE 1

| Sample Number | Drying Time (Min) | % Total Volatiles | % Hexanes + Acetone |
|---|---|---|---|
| 1 | 0 | 24.477 | 7.882 |
| 2 | 1 | 25.016 | 8.304 |
| 3 | 2 | 8.429 | 1.048 |
| 4 | 3 | 14.231 | 5.33 |
| 5 | 4 | 14.995 | 6.032 |
| 6 | 5 | 10.358 | 2.079 |
| 7 | 6 | 9.562 | 0.539 |
| 8 | 15 | 4.71 | 0.352 |
| 9 | 20 | 2.653 | 0.137 |
| 10 | 25 | 2.076 | 0.088 |
| 11 | 30 | 1.069 | 0.049 |
| 12 | 35 | 0.782 | 0.044 |
| 13 | 40 | 1.036 | 0.046 |
| 14 | 45 | 2.141 | 0.081 |
| 15 | 50 | 1.077 | 0.043 |
| 16 | 55 | 0.896 | 0.039 |
| 17 | 60 | 0.941 | 0.038 |
| 18 | 70 | 0.801 | 0.034 |
| 19 | 80 | 0.908 | 0.033 |
| 20 | 90 | 0.667 | 0.06 |
| 21 | 100 | 0.608 | 0.024 |
| 22 | 110 | 0.577 | 0.023 |
| 23 | 120 | 0.404 | 0.02 |

Example 2

A quantity of solvent-wet bagasse was processed through a tray dryer in order to remove the solvents and produce dry bagasse. The solvent-wet bagasse resulted from the following general process: guayule shrub material was subjected to size reduction (chipping to reduce the shrub to 1-3" size pieces), followed by hammer milling and then screened using a 1" screen), the size reduced guayule shrub material was subjected to solvent extraction (using 80% hexane, 20% acetone) to remove most of the rubber an resin from the guayule shrub material. The solvent-wet bagasse was fed into a stainless steel tray dryer. The dryer contained 16 drying trays and 4 cooling trays. The tray dryer was configured so as to allow heated air to circulate over the top and bottom of each tray. The temperature inside of the tray dryer was maintained at 70-85° C. and the atmosphere inside of the tray dryer was maintained at +25 to −10 inches of $H_2O$. Bagasse was allowed to remain in the tray dryer for approximately 1-1.5 hours. The solvent-wet bagasse entering the tray dryer had a solvent content of about 40-75 weight % and the bagasse exiting the tray dryer had a solvent content of no more than about 1500 ppm.

Example 3

A quantity of solvent-wet bagasse was processed through a desolventization screw extruder in order to remove the solvents and produce dryer bagasse. Dried guayule bagasse obtained from a previous trial was wet with solvent (hexane) to produce a composition containing 70 weight % solvent and 30 weight % bagasse. The solvent-wet bagasse was fed into the desolventization screw extruder. The screw extruder was configured to allow input of the bagasse, followed by hexane feed. Two solvent tanks were placed below the extruder to collect solvent, with a 0.3 mm slit and seal configuration in the extruder above the first solvent tank and a 0.15 mm slit and seal configuration in the extruder above the second solvent tank. The area of the extruder encompassing the solvent tanks was considered the dewatering zone. Subsequent to the dewatering zone, was another a degasification vacuum over a 200 mesh filter followed by another vacuum after which the dryer bagasse was to exit the extruder via a die. The use of aggressive (i.e., thicker and tighter) seals was found to result in undesirable compacting of the bagasse material; changing to less aggressive seals allowed for dewatering to begin in solvent tank 1.

Various operating conditions were investigated as summarized in Table 2 below. In later trials, because the amount of dry bagasse was limited, recycled bagasse (containing 10-20 weight % solvent) was reused by mixing with hexane to make a 30% solvent containing feed. Despite the lowering of the solvent content on the solvent-wet bagasse being fed into the screw extruder, problems with clogging were still experienced with the degasification vacuum present near the end of the extruder such that in only one instance was it possible to draw a vacuum on the 200 mesh filter.

TABLE 2

| Sample # | Hexane (kg/h) | Bagasse (kg/h) | Screw config. | Screw speed (rpm) | Slit size 1st | Slit size 2nd | vacuum | Solvent tank (kg/h) 1st | Solvent tank (kg/h) 2nd | % solvent in discharge bagasse |
|---|---|---|---|---|---|---|---|---|---|---|
| 1 | 55 | 25 | 3 | 100 | 0.15 | 0.8 | X | X | x | X |
| 2 | 77 | 77 | 4 | 200 | 0.3 | 0.15 | X | 45 | X | 43% |
| 3 | 77 | 77 | 4 | 300 | 0.3 | 0.15 | X | 20 | X | 55% |
| 4 | 77 | 77 | 4 | 150 | 0.3 | 0.15 | X | 46 | X | 36% |
| 5 | 77 | 77 | 4 | 100 | 0.3 | 0.15 | X | 55 | X | 30% |
| 6 | 77 | 77 | 4 | 100 | 0.3 | 0.15 | X | 55 | X | 27% |
| 7 | 77 | 77 | 4 | 80 | 0.3 | 0.15 | X | | | 26% |
| 8 | 130 | 77 | 4 | 150 | 0.3 | 0.15 | X | | | 29% |
| 9 | 130 | 77 | 4 | 200 | 0.3 | 0.15 | X | | | 38% |
| 10 | 130 | 77 | 4 | 100 | 0.3 | 0.15 | X | | | 26% |
| 11 | 130 | 77 | 4 | 300 | 0.3 | 0.15 | X | | | Free liquid |
| 12 | 31 | 77 | 5 | 120 | X | X | X | | | 18% |
| 13 | 31 | 50 | 5 | 100 | X | X | X | | | 33% |
| 14 | 31 | 77 | 5 | 100 | X | X | X | | | 28% |
| 15 | | | | Recycled Bagasse | | | | | | 10% |
| 16 | 16 | 77 | 6 | 100 | X | X | X | | | 13% |
| 17 | 16 | 77 | 6 | 100 | X | X | X | | | 16% |
| 18 | | 77 | | 100 | x | X | Yes | | | 20% |

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, *A Dictionary of Modern Legal Usage* 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus, and illustrative examples shown and described. Accordingly, departures may be made from such details without departing from the spirit or scope of the applicant's general inventive concept.

What is claimed is:

1. A method for removing organic solvents from wet guayule bagasse comprising:
    utilizing a quantity of wet bagasse that contains up to 75 weight % combined organic solvents and water (based upon total weight of the wet bagasse) and no more than 0.1 weight % rubber;
    heating the wet bagasse to a temperature of at least 100° C. utilizing a dryer apparatus containing multiple layers, circulating heated air through the layers, and passing the wet bagasse from one layer to another whereby the organic solvents are evaporated, thereby creating evaporated organic solvents;
    producing dried bagasse that contains no more than 1 weight % organic solvents.

2. The method of claim 1, wherein the heating occurs for no more than 10 minutes at a temperature of at least 110° C.

3. The method of claim 1, wherein the heating occurs for no more than 8 minutes at a temperature of 125° C.

4. The method of claim 1, wherein the heating occurs for no more than 7 minutes at a temperature of at least 125° C.

5. The method of claim 1, wherein the dried bagasse contains no more than 0.5 weight % organic solvents.

6. The method of claim 1, wherein the wet bagasse remains in the apparatus for 5-90 minutes.

7. The method of claim 1, wherein the heating is achieved by heated steam.

8. The method of claim 1, further comprising condensing the evaporated organic solvents and collecting the evaporated organic solvents separately from the dried bagasse.

9. The method of claim 1, wherein the wet bagasse contains 45 to 75 weight % combined organic solvents and water (based upon total weight of the wet bagasse).

10. The method of claim 1, wherein the combined solvents are acetone and hexane.

11. The method of claim 9, wherein the combined solvents are acetone and hexane.

12. The method of claim 1, wherein the wet bagasse is heated to a temperature of between 100 and 200° C.

13. A method for removing organic solvents from wet bagasse comprising:
    utilizing a quantity of wet bagasse that contains up to 75 weight % combined organic solvents and water (based upon total weight of the wet bagasse) and no more than 0.1 weight % rubber;
    heating the wet bagasse to a temperature of at least 100° C. utilizing a dryer apparatus containing multiple paddles for mixing the wet bagasse with heated air to evaporate the organic solvents, thereby creating evaporated organic solvents;
    producing dried bagasse that contains no more than 1 weight % organic solvents.

14. The method of claim 13, wherein the heating occurs for no more than 10 minutes at a temperature of at least 110° C.

15. The method of claim 13, wherein the wet bagasse remains in the apparatus for 5-90 minutes.

16. The method of claim 13, further comprising condensing the evaporated organic solvents and collecting the evaporated organic solvents separately from the dried bagasse.

17. The method of claim 13, wherein the wet bagasse contains 45 to 75 weight % combined organic solvents and water (based upon total weight of the wet bagasse).

18. The method of claim 13, wherein the combined solvents are acetone and hexane.

19. The method of claim 17, wherein the combined solvents are acetone and hexane.

20. A method for removing organic solvents from wet bagasse comprising:

utilizing a quantity of wet bagasse that contains up to 75 weight % combined organic solvents and water (based upon total weight of the wet bagasse) and no more than 0.1 weight % rubber;

heating the wet bagasse to a temperature of at least 100° C. utilizing a desolventization screw extruder apparatus to evaporate the organic solvents, thereby creating evaporated organic solvents;

producing dried bagasse that contains no more than 1 weight % organic solvents.

21. The method of claim 20, wherein the heating occurs for no more than 10 minutes at a temperature of at least 110° C.

22. The method of claim 20, wherein the wet bagasse remains in the apparatus for 5-90 minutes.

23. The method of claim 20, further comprising condensing the evaporated organic solvents and collecting the evaporated organic solvents separately from the dried bagasse.

24. The method of claim 20, wherein the wet bagasse contains 45 to 75 weight % combined organic solvents and water (based upon total weight of the wet bagasse).

25. The method of claim 20, wherein the combined solvents are acetone and hexane.

26. The method of claim 24, wherein the combined solvents are acetone and hexane.

* * * * *